(12) United States Patent
Simon

(10) Patent No.: US 8,978,588 B2
(45) Date of Patent: Mar. 17, 2015

(54) CAT LITTER BOX

(76) Inventor: David A. Simon, Harrison Township, MI (US)

( * ) Notice: Subject to any disclaimer, the term of this patent is extended or adjusted under 35 U.S.C. 154(b) by 65 days.

(21) Appl. No.: 13/441,493

(22) Filed: Apr. 6, 2012

(65) Prior Publication Data

US 2012/0255497 A1 Oct. 11, 2012

Related U.S. Application Data

(60) Provisional application No. 61/472,589, filed on Apr. 6, 2011, provisional application No. 61/490,034, filed on May 25, 2011.

(51) Int. Cl.
*A01K 1/035* (2006.01)
*B65D 5/60* (2006.01)
*A01K 1/01* (2006.01)
*A01K 1/015* (2006.01)

(52) U.S. Cl.
CPC ............... *B65D 5/60* (2013.01); *A01K 1/0107* (2013.01); *A01K 1/0152* (2013.01)
USPC .......................................... 119/168; 119/165

(58) Field of Classification Search
USPC ......... 119/161, 165, 166, 167, 168, 169, 171, 119/172, 173, 174; 206/554, 223, 499; 229/101.1, 101.2, 101.3; 294/1.3; 220/495.06, 495.07, 495.08, 495.09, 220/495.1, 495.11
See application file for complete search history.

(56) References Cited

U.S. PATENT DOCUMENTS

| | | | |
|---|---|---|---|
| 1,824,927 A | 9/1931 | Powell | |
| 2,917,221 A | 12/1959 | Risdon | |
| 3,581,977 A | 6/1971 | Kirsky et al. | |
| 3,726,467 A | 4/1973 | Shepherd | |
| 4,628,863 A | 12/1986 | Eichenauer | |
| 4,779,567 A * | 10/1988 | Smith | 119/165 |
| 4,801,006 A * | 1/1989 | Martin et al. | 119/170 |
| 4,807,563 A * | 2/1989 | Berry et al. | 119/168 |
| 4,919,078 A * | 4/1990 | Morrison | 119/168 |
| 4,946,093 A | 8/1990 | Moorman | |
| 4,967,692 A | 11/1990 | Mills | |
| 5,020,337 A | 6/1991 | Krieg | |
| 5,035,205 A | 7/1991 | Schiller et al. | |
| 5,080,044 A | 1/1992 | Bosworth | |
| 5,207,772 A * | 5/1993 | Lauretta et al. | 119/167 |
| 5,551,376 A * | 9/1996 | Lundeen et al. | 119/167 |
| 5,572,951 A * | 11/1996 | Evans et al. | 119/168 |
| 5,983,832 A | 11/1999 | Seo | |
| 2002/0190069 A1 * | 12/2002 | Cuisinier | 220/495.11 |
| 2004/0200424 A1 | 10/2004 | Stolpe | |
| 2008/0202440 A1 | 8/2008 | Stratton | |
| 2009/0095800 A1 | 4/2009 | Tao | |

* cited by examiner

*Primary Examiner* — Rob Swiatek
*Assistant Examiner* — Ebony Evans
(74) *Attorney, Agent, or Firm* — Carlson, Gaskey & Olds P.C.

(57) ABSTRACT

A litter box includes a tray having a bottom wall and side walls extending upward from the bottom wall. At least one of the side walls has an upper portion that is moveable from a retracted position to an upright position. A plurality of bags are in the tray, each containing a layer of litter. The layers of litter are separated from one another by the bags. In another embodiment, the plurality of bags of litter are provided in an outer bag that can be placed into a tray. In use, upper portions of each bag are lifted over the side walls to expose the litter in that bag. After use, the entire layer of litter can be removed by removing the associated bag. The next layer of litter is then exposed for use.

14 Claims, 12 Drawing Sheets

CAT LITTER BOX

This application claims priority to U.S. Provisional Application Ser. Nos. 61/472,589 filed Apr. 6, 2011 and 61/490,034 filed May 25, 2011.

BACKGROUND

Cat litter boxes are often messy, dirty and difficult to manage. The litter is never completely clean even after scooping out clumps (for the clumping type litter). After some time, the litter box itself is dirty and begins to smell even when the litter is changed. Further, adding litter to the litter box can also be difficult and messy because the litter is often sold in very large bags.

SUMMARY

A litter box according to one embodiment of the present invention includes a tray having a bottom wall and side walls extending upward from the bottom wall. At least one of the side walls has an upper portion that is moveable from a retracted position to an upright position. Litter is provided in each of a plurality of bags in the tray. Each bag defines a layer of litter, with each layer of litter separated from the others by the bags.

The user purchases the litter box and flips open the upper portions of the side walls to increase the height of the box above the level of the litter. The upper portions of at least the first bag are lifted over the upper portions of the side walls to expose the first layer of litter. After some amount of use, the first layer of litter can be removed by removing the first bag. The second layer of litter is then exposed with the second bag draped over the upper portions of the side walls. During use of each layer, the other layers of litter are separated from the exposed layer of litter by the plastic bag. Thus, each layer as it is exposed is completely clean. Further, the walls of the litter box are kept clean by the bags. After the last layer is used, the entire litter box is discarded or recycled and a fresh, clean box is purchased to replace it. Thus, the improved litter box is consistently cleaner and easier to manage than existing litter boxes.

In another embodiment, a plurality of inner bags each having a layer of litter, are contained by an outer bag. The layers of litter are separated from one another by the inner bags. The outer bag with layers of litter and inner bags is purchased by the user, brought home and placed in a tray. The outer bag is opened in the upper portion of at least the first inner bag is lifted over the side walls of the tray, thereby exposing the first layer of litter. Again, each layer is completely removed by removing its inner bag as each layer is used. As each new layer is exposed, it is completely clean.

In another embodiment, a carton for beverage containers includes a bottom wall and side walls extending upward from the bottom wall. Each of the side walls is continuous with a flat portion forming an upper wall together with a removable center portion. The flat portions are connected to each other and to the center portion by perforations. A plurality of beverage containers are within the carton. In use, the flat portions are separated and the center portion is removed. The flat portions are folded upward to extend the height of the side walls. An optional plastic bag or liner within the carton may be lifted over the side walls. The extended side walls define the extended volume into which ice can be added.

DESCRIPTION OF A PREFERRED EMBODIMENT

Figure 1:
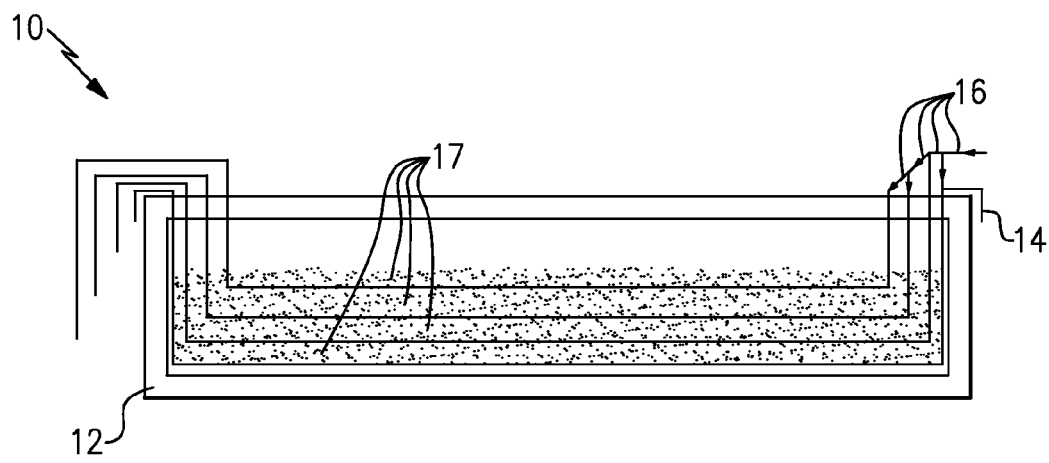
FIG. 1 is a section view through a litter box according to a first embodiment.

An improved cat litter box 10 is shown in FIG. 1. The litter box 10 includes a bottom tray 12, which could be cardboard (alternatively, the tray 12 could be plastic). A bottom liner 14 may optionally be secured to the interior of the bottom tray 12, such as by adhesive, particularly if the bottom tray is porous (e.g. cardboard).

A plurality of layers are formed within the tray 10. Each layer includes a thin, flexible, plastic, non-porous liner bag 16. The bags 16 may be similar in material to garbage bags or plastic grocery bags. On each bag 16 is a layer of cat litter 17. In FIG. 1, the bags 16 are shown nested within one another, such that the bottom of each bag is placed directly on the litter 17 in the bag below it. Alternatively, the bags could be closed to one another, with the top of each bag 16 folded over the litter 17 inside it, and the bottom of the bag 16 above in direct contact with the top of the lower bag 16.

Figure 2:
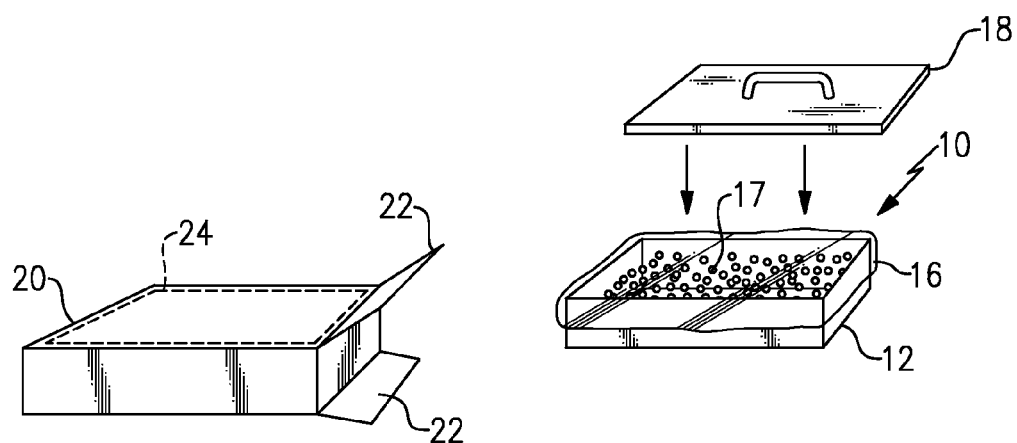
FIG. 2 is a perspective view showing assembly of the litter box of FIG. 1

As shown in FIG. 2, a lid 18, such as a cardboard lid with a handle, is placed on the litter box 10, loaded with layers of bags 16 and litter 17 to create a fairly tight package. The litter box 10 and lid 18 are inserted into a case 20, which may be a cardboard box having open flaps 22 at one end and a perforations 24 in an upper panel. The flaps 22 are then sealed to form a unit that can be sold to cat owners at a retail store.

The user takes the case 20 home and opens the upper panel by tearing along the perforations and then removing the lid 18, thereby exposing the top layer of cat litter 17. An upper portion of at least the top bag 16 is lifted over the sides of the box 10. When the top layer of cat litter 17 is dirty, the user removes the top bag 16 and removes all of the top layer of cat litter 17. As each layer of litter 17 is used, it is removed by the next bag 16. When the litter 17 in the last bag 16 is used, the case 20 and tray 12 are discarded or recycled.

In this manner, there is no need to lift heavy bags of litter or come into contact with the dirty litter. It is easy to maintain clean litter and a clean litter box.

Figure 3:
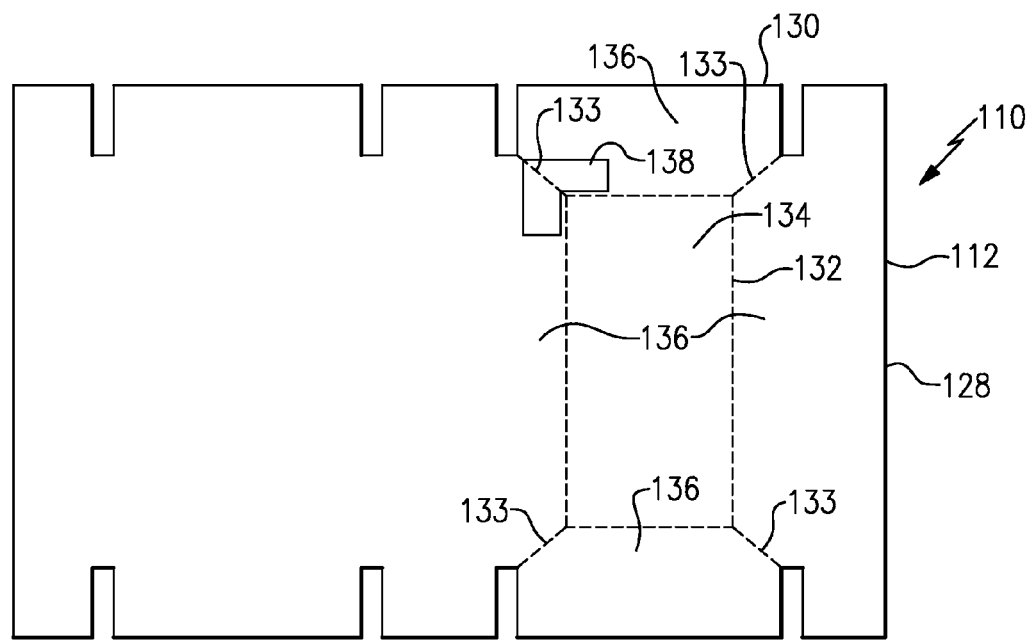
FIG. 3 is a plan view of a blank for a litter box according to a second embodiment.

FIGS. 3-6 show an alternative cat litter box 110, with extending side walls. Referring to FIG. 3, a case 112 is shown as the unfolded, cut cardboard sheet 128. An upper wall of the sheet 128 includes perforations 132 for permitting removal of a center portion 134. The upper wall of the sheet 128 also includes perforations 133 for separating upper flaps 136. Connectors 138 connect adjacent upper flaps 136 on the underside of the sheet 128, such as by adhesive.

Figure 4:
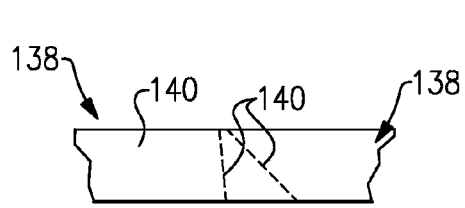
FIG. 4 is a plan view of a connector for the litter box of FIG. 3.
Figure 5:
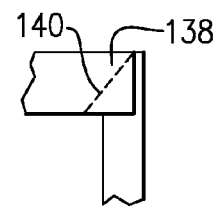
FIG. 5 shows the connector of FIG. 4 is a folded position.

Referring to FIG. 4, each of the connectors 138 may be an elongated strip of cardboard (or paper, or plastic, or other suitable material) folded along the fold lines 140 of FIG. 4 to the ninety degree configuration of FIG. 5. A portion on each side of the fold lines 140 is attached to an associated one of the adjacent upper flaps 136.

The sheet 128 is folded into a carton in a known manner and is loaded with the layers of bags 16 and cat litter 17 as described with respect to FIGS. 1 and 2, including the lid 18.

Figure 6:
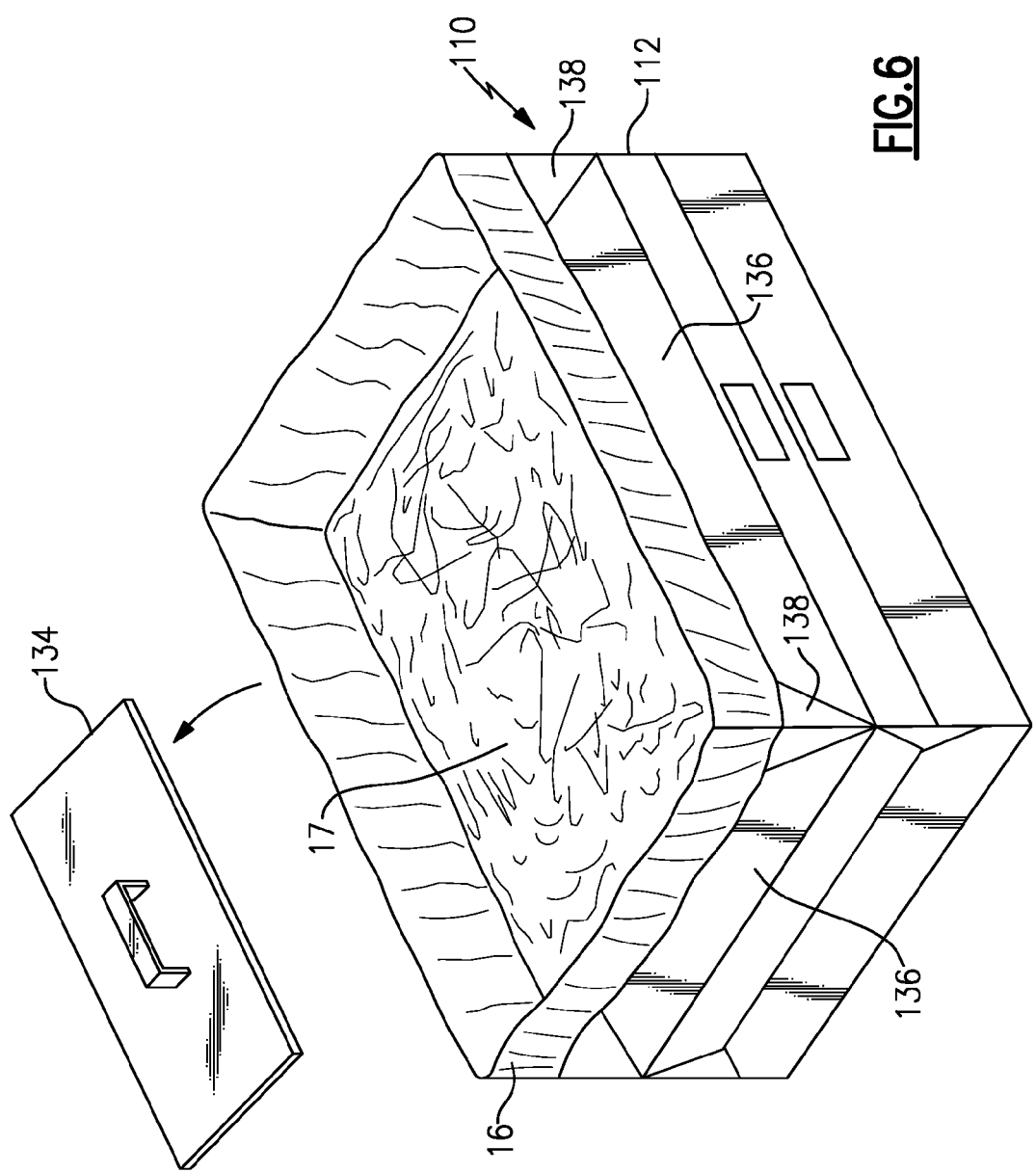
FIG. 6 is a perspective view of the litter box of FIG. 3 in an assembled loaded configuration.

Referring to FIG. 6, when the perforations 132, 133 are torn, the user can remove the center portion 134 and fold the upper flaps 136 upward, thereby unfolding the connectors 138 and providing extended height side walls to form the tray of the cat litter box 110. The user can then remove the lid 18. The uppermost bag 16 is then draped over the side walls (upper flaps 136) of the cat litter box 110. The cat litter 17 of the first layer is thereby exposed and ready for use. The cat litter box 110 and its layers of bags 16 and cat litter 17 are used as described in the first embodiment. The extended height side walls prevent cat litter 17 from being knocked out of the cat litter box 110.

Alternatively, one of the perforations 132 can be a fold line, such that the cat litter box 110 is provided with a hinged lid.

Figure 7:
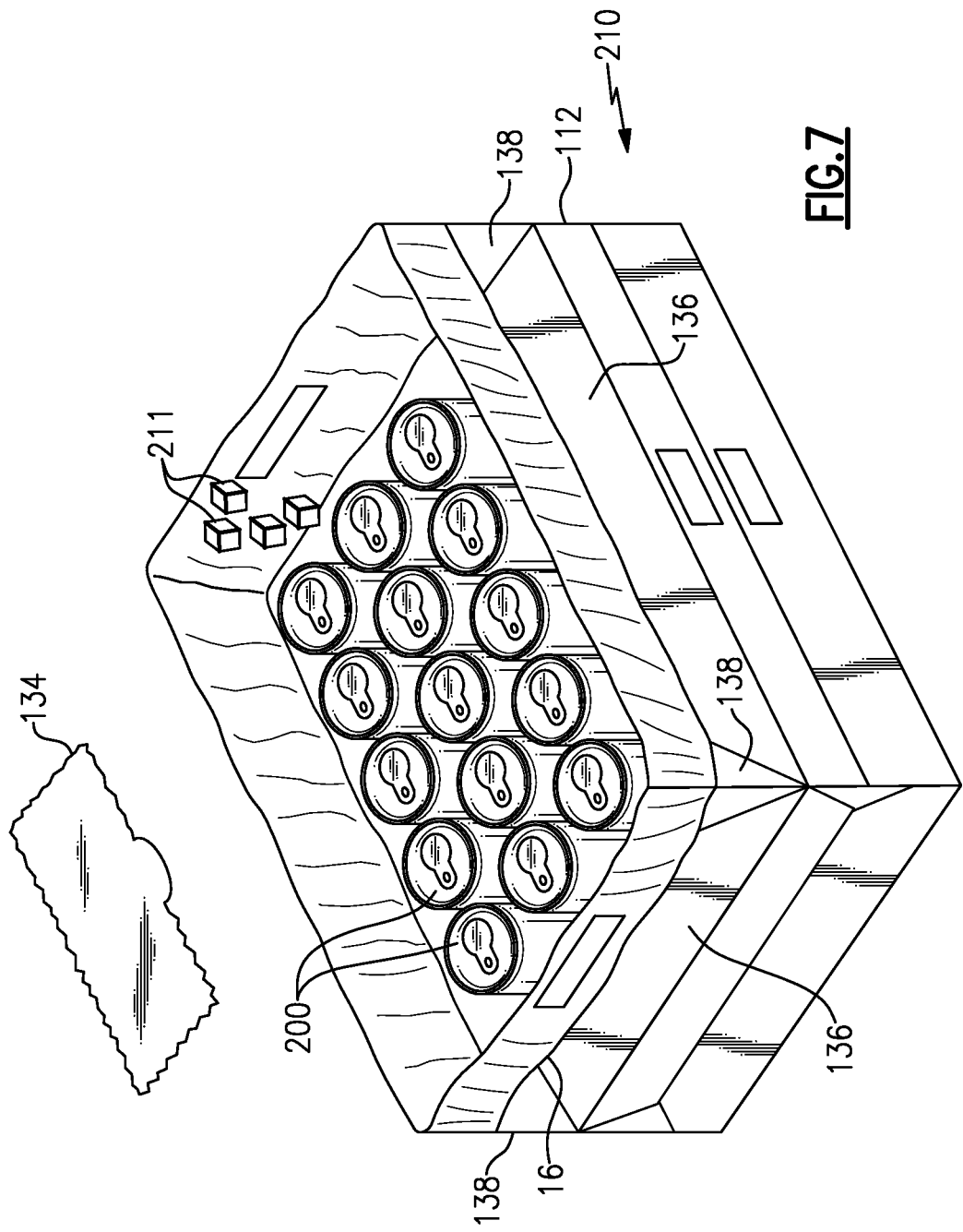
FIG. 7 shows a perspective view of an expandable box used as a beverage container and cooler.

As is shown in FIG. 7, the same box configuration of FIGS. 3-6 can be used as a carton 210 for containers 200 (cans, bottles, cups, etc.) of beverages (or food). After purchasing, the user can tear the perforations, remove the center portion 134 and fold up the upper flaps 136 as before. Optionally, a single bag is provided inside the carton 210, the upper portion of which would then be draped over the upper flaps 136. The extended carton 210 now has room for ice 211 (only a few cubes are shown, but most of the volume created by the flaps 136 would likely be filled), which can be dumped into the carton 210 on top of the containers 200. The carton 210 provides a disposable cooler which is a simple modification of an existing beverage carton that does not occupy any more space when shipped and sold.

Figure 8:
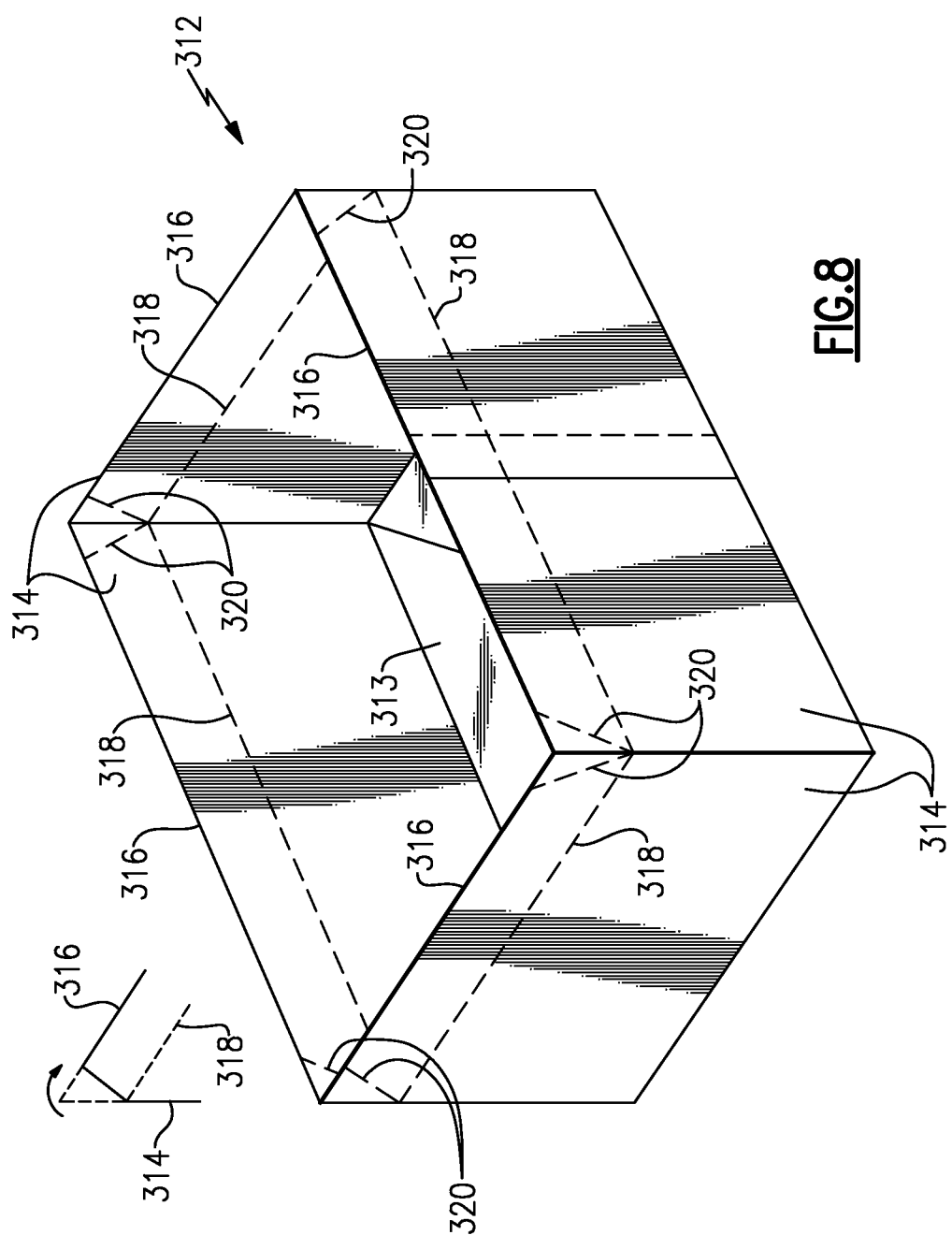
FIG. 8 is a perspective view of an expandable box or tray for use in a litter box.

FIG. 8 illustrates another alternative cat litter box tray or case 312 with extending side walls 314. The case 312 includes a base 313 and side walls 314 extending upward from the base. Each side wall 314 includes an upper portion 316 that can fold inward on a fold line 318. The corners of the side walls 314 have fold lines 320 that permit the upper portions 316 to fold inward ninety degrees to a retracted or closed or collapsed position. As shown in the enlarged portion of FIG. 8, the corners can be folded inward relative to the upper portions 316 in order to fold the upper portions 316 of the side walls 314 inward.

Figure 9:
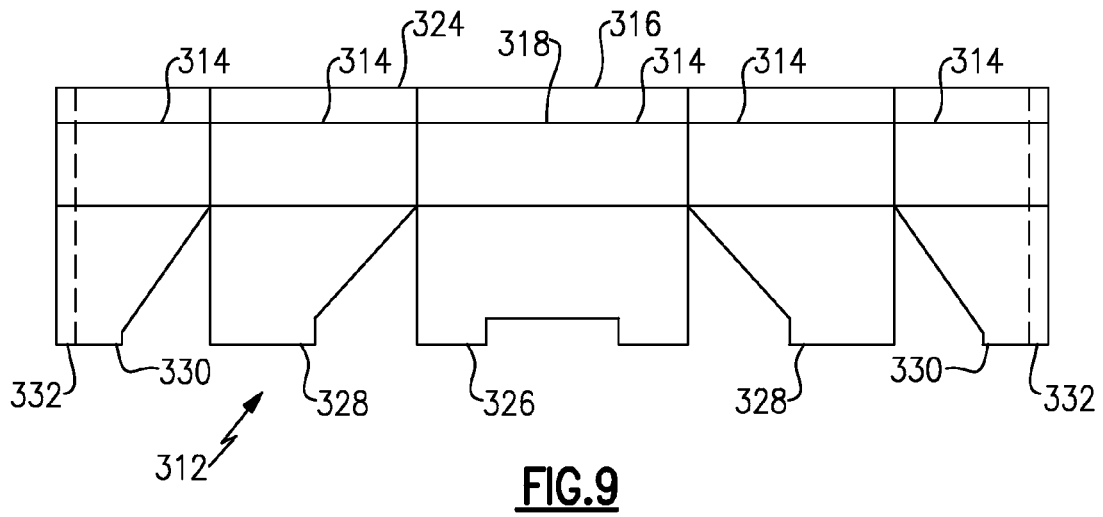
FIG. 9 is a plan view of a blank for creating the box of FIG. 8.

FIG. 9 is an example blank that could be used to make the case 312 of FIG. 8. The blank includes five panels that form the four side walls 314 of the case 312, where the two outer panels have slightly overlapping portions 332. A fold line 318 defines the upper portions 316 of the side walls 314. The base 313 (FIG. 8) is formed by central lower panel 326, side lower panels 328 and end lower panels 330.

Figure 10:
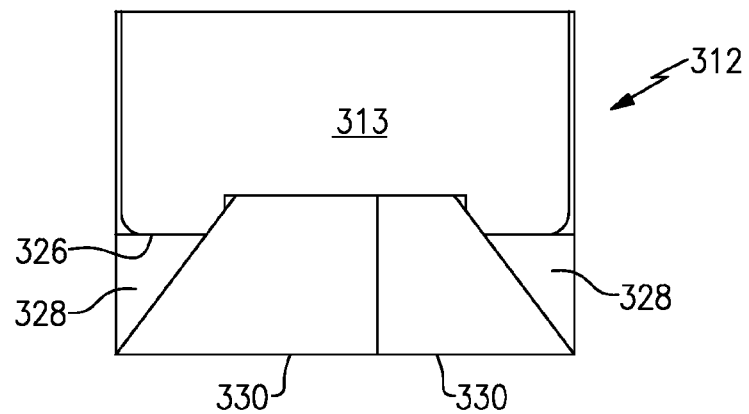
FIG. 10 is a bottom view of the box of FIG. 8.

FIG. 10 is a bottom view of the case 312, which illustrates the assembly of the case 312 from the blank of FIG. 9. As shown, the base 313 formed by the side lower panels 328, the central lower panel 326 and the end lower panels 330, with tabs of the end lower panels 330 inserted into a slot defined in the central lower panel 326. Other configurations could be used for the base 313 of the case 312.

Figure 11:
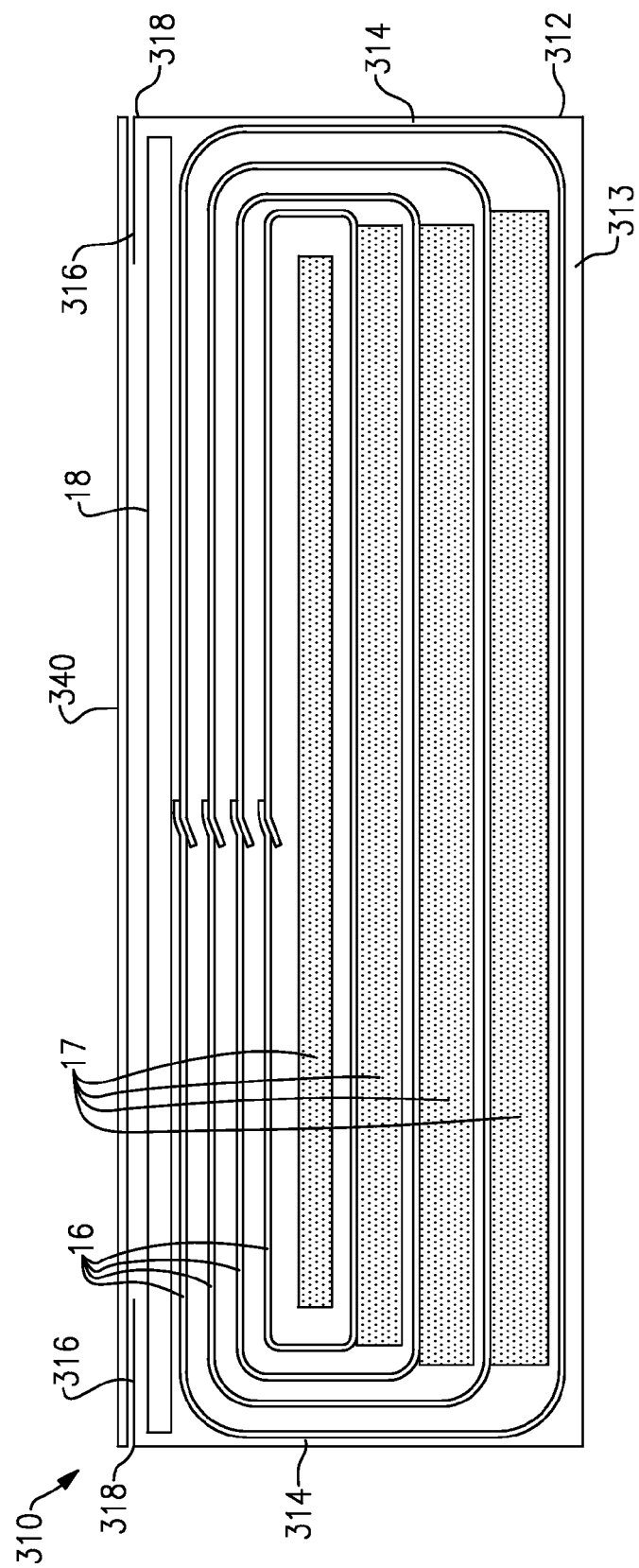
FIG. 11 is a section view through a litter box according to a third embodiment, including the box of FIG. 8.

FIG. 11 is a section view through a cat litter box 310 using the case 312. As shown, a plurality of layers of litter 17 are disposed within the case 312, with the plurality of bags 16 between the layers of litter 17. Again, in this example, the bags 16 are nested, such that each bag 16 is directly on the litter of the layer below it and each bag 16 is within the bag 16 below it. The upper portions of all of the bags 16 around the openings to the bags 16 are brought together at the top of the case 312. Note that extra space is shown in FIG. 11 for clarity, but it is anticipated that the case 312 would be tightly packed with litter 17 and the bags 16.

A first lid 318 may be placed on the bags 16 and layers of litter 17. The upper portions 316 are then folded down on top of the first lid 318, the bags 16 and the litter 17. A second lid 340 may be placed over the upper portions 316 of the side walls 314 and the first lid 318. The second lid 340 may be secured to the case 312 by straps, string, tape, a wrapper, etc. (not shown) for sale and shipping and for removal by the customer before use.

Figure 12:
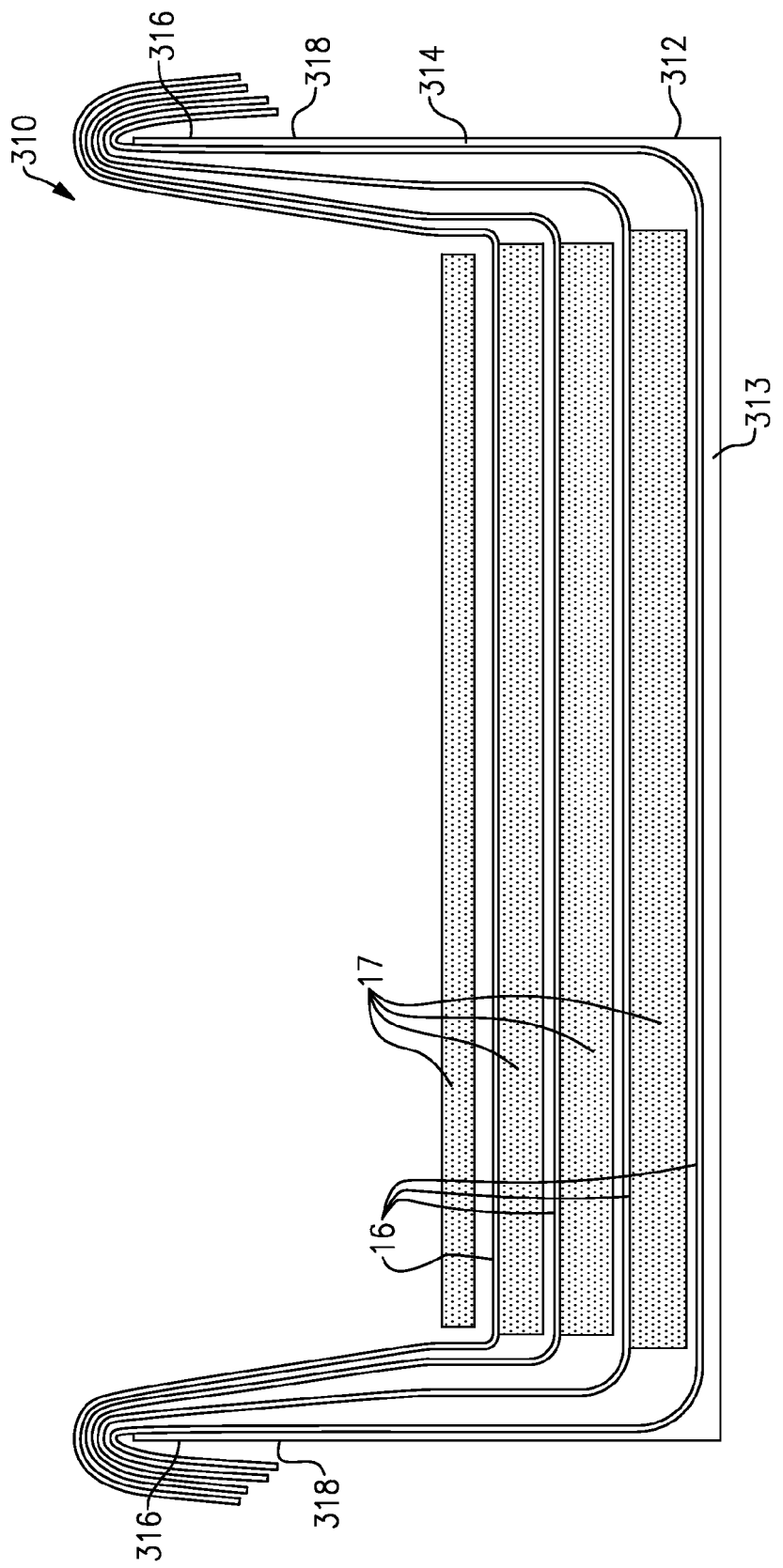
FIG. 12 shows the litter box of FIG. 11 assembled into a use configuration.

Referring to FIG. 12, in use the user removes the second lid 340 and folds the upper portions 316 of the side walls 314 upward to the upright position shown. The first lid 18 is removed. The upper portions of the bags 16 are the lifted out of the case 312 and draped or pulled over the upper portions of the side walls 314. This exposes the first layer of litter 17 in the top bag 16. When the first layer 17 of litter 17 needs to be removed, the first bag 16 is lifted from the case 312 taking with it the entire first layer of litter 17. This exposes the second layer of litter 17, which, having been separated from the first layer of litter 17 by a plastic bag 16, is completely clean. The subsequent layers of litter 17 are sequentially used and removed in this manner. When the case 312 is empty, it is disposed of/recycled and replaced. In this manner a clean litter box 310 is assured. Further, there is no need to handle litter, scoop litter or lift large bags of litter to pour into a litter box.

Figure 13:
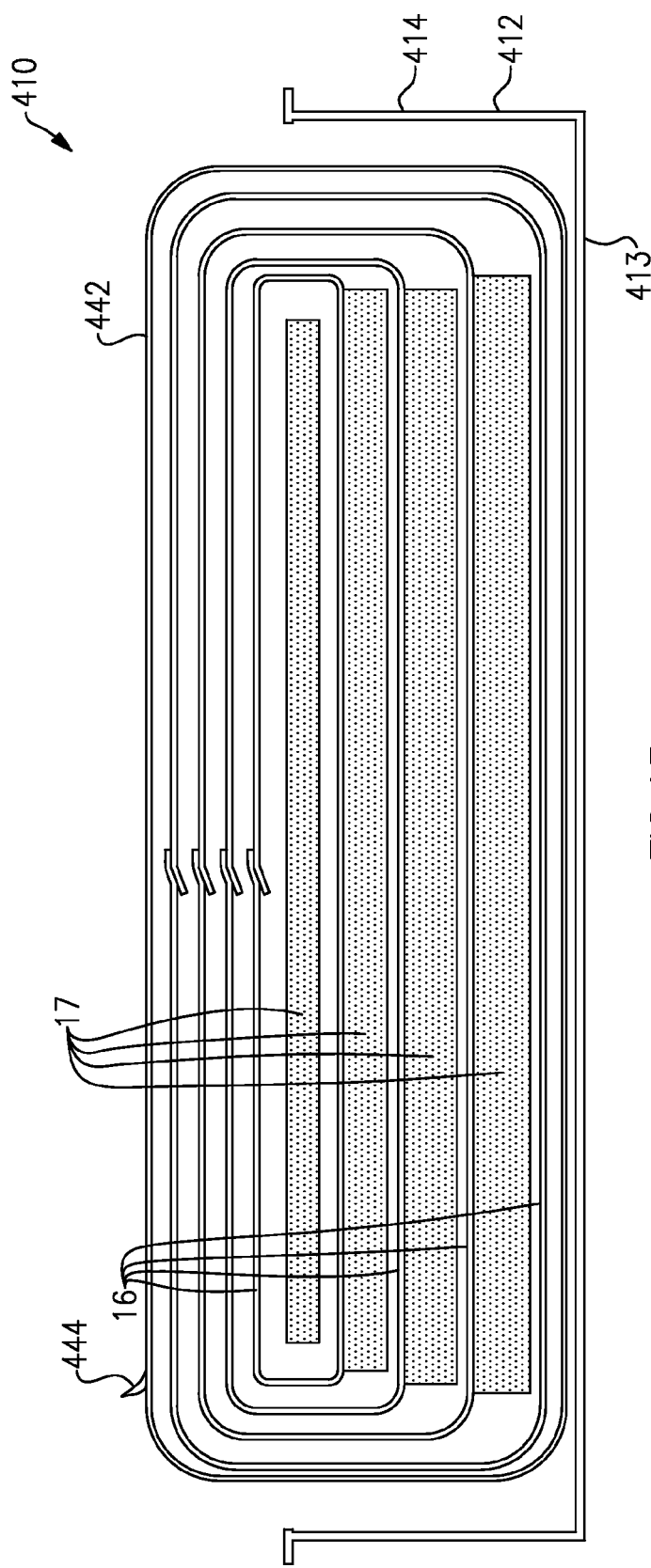
FIG. 13 is a section view through a litter box according to a fourth embodiment.
Figure 14:
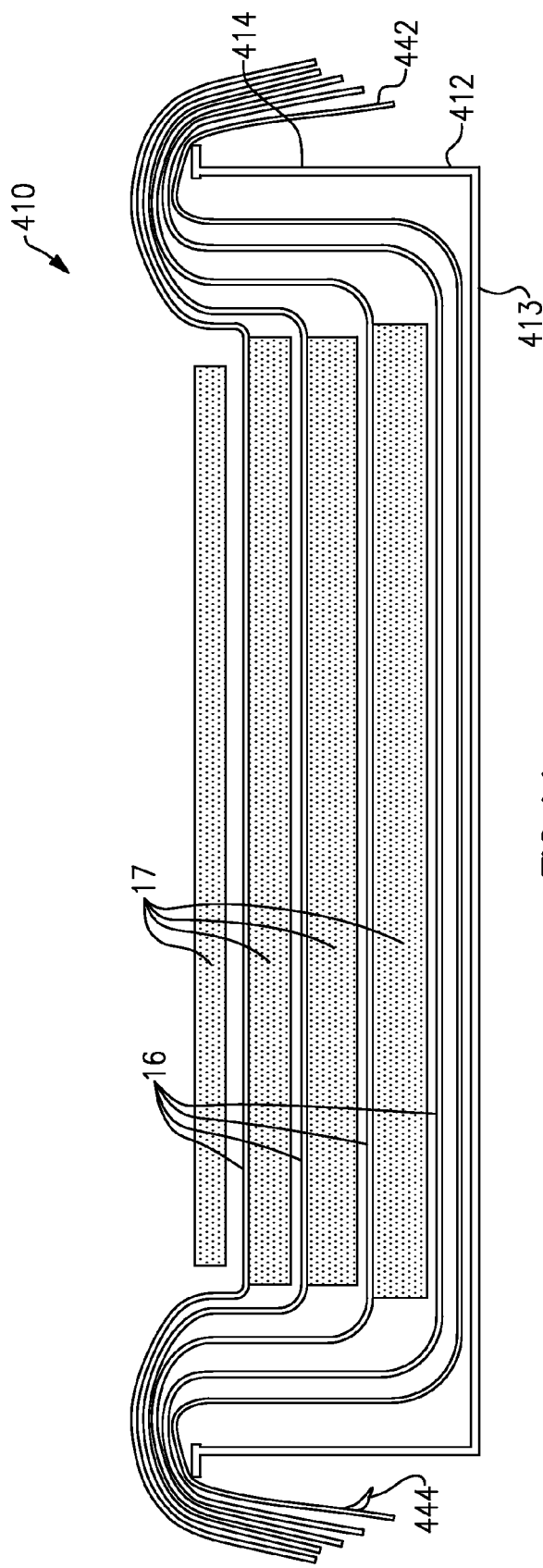
FIG. 14 shows the litter box of FIG. 13 assembled into a use configuration.

Another embodiment of a litter box 410 is shown in FIGS. 13 and 14. In this embodiment, the litter 17 is sold in the plurality of inner bags 16 (same as the bags 16 in the previous embodiments) which are inside an outer bag 442. The outer bag 442 may be thicker, heavier duty, stronger and/or tougher than the inner bags 16, such that the outer bag 442 can survive shipping and sale to the user. The outer bag 442 may have one or more tear strips 444 to assist in opening the outer bag 442. Note that extra space is shown in FIG. 13 for clarity, but it is anticipated that the outer bag 442 would be tightly packed with litter 17 and the bags 16.

The user purchases the outer bag 442 containing the litter 17 and inner bags 16 and brings it home to place into a tray 412 (which may be sold separately or an existing litter box tray). The tray 412 includes a base wall 413 with side walls 414 extending upward from the base 413.

The user opens the outer bag 442, such as by pulling the tear strip 444. The user then places the upper portions of the outer bag 442 and the inner bags 16 over the upper portions of the side walls 414, as shown in FIG. 14. This exposes the first layer of litter 17 in the top bag 16. When the first layer 17 of litter 17 needs to be removed, the first bag 16 is lifted from the tray 412, taking with it the entire first layer of litter 17. This exposes the second layer of litter 17, which, having been separated from the first layer of litter 17 by a plastic bag 16, is completely clean. The subsequent layers of litter 17 are sequentially used and removed with the subsequent bags 16 in this manner. When outer bag 442 is empty, it is disposed of/recycled and replaced. A new outer bag 442 with new bags 16 and litter 17 is then placed in the tray 412, as in FIG. 13.

The box configurations of FIGS. 8-12 could also be used as the beverage container/cooler of FIG. 7. In the litter box embodiments, any type of litter can be used. For example, clumping litter could be used so that the user can scoop out used litter a few times before removing each layer. Further, in the bags 16 are shown nested within one another, such that the bottom of each bag is placed directly on the litter 17 in the bag below it. Alternatively, the bags could be closed to one another, with the top of each bag 16 folded over the litter 17 inside it, and the bottom of the bag 16 above in direct contact with the top of the lower bag 16.

Figure 15:
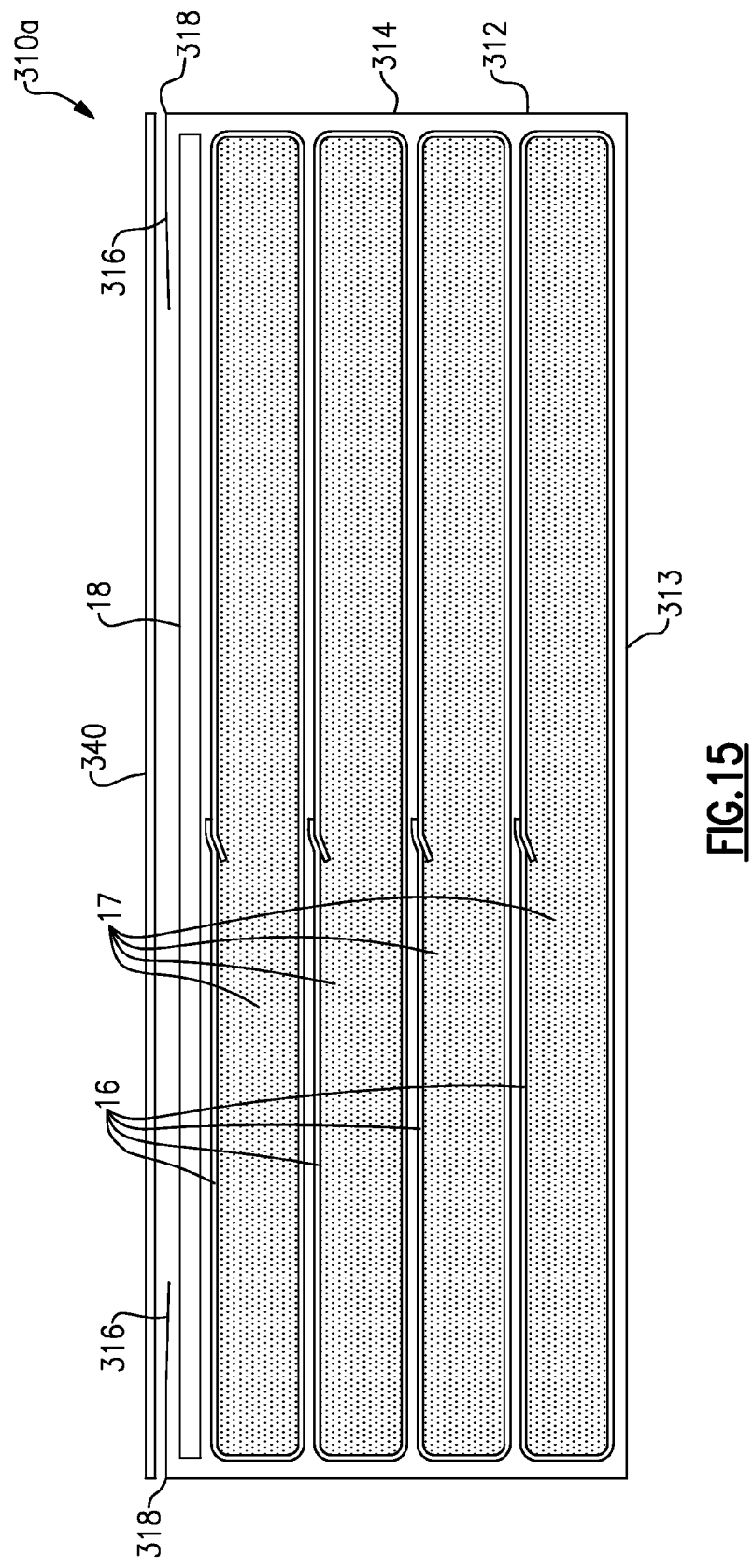
FIG. 15 shows the litter box of FIG. 11 with an alternate arrangement of the inner bags.

FIG. 15 shows an alternate litter box 310a to the litter box 310 of FIG. 11 with an alternate arrangement of the inner bags 16. As shown, the bags 16 are closed to one another, with the upper portion of each bag 16 folded directly over the litter 17 inside it. The bottom of each bag 16 is in direct contact with the upper portion of the bag 16 below it. The litter box 310a is used in much the same way as the litter box 310 of FIG. 11, although only the upper portion of only one bag 16 at a time is draped over the side walls 14. The layers of litter 17 are exposed one at a time and removed after use by removing the bag 16 that contains that layer of litter 17.

Figure 16:
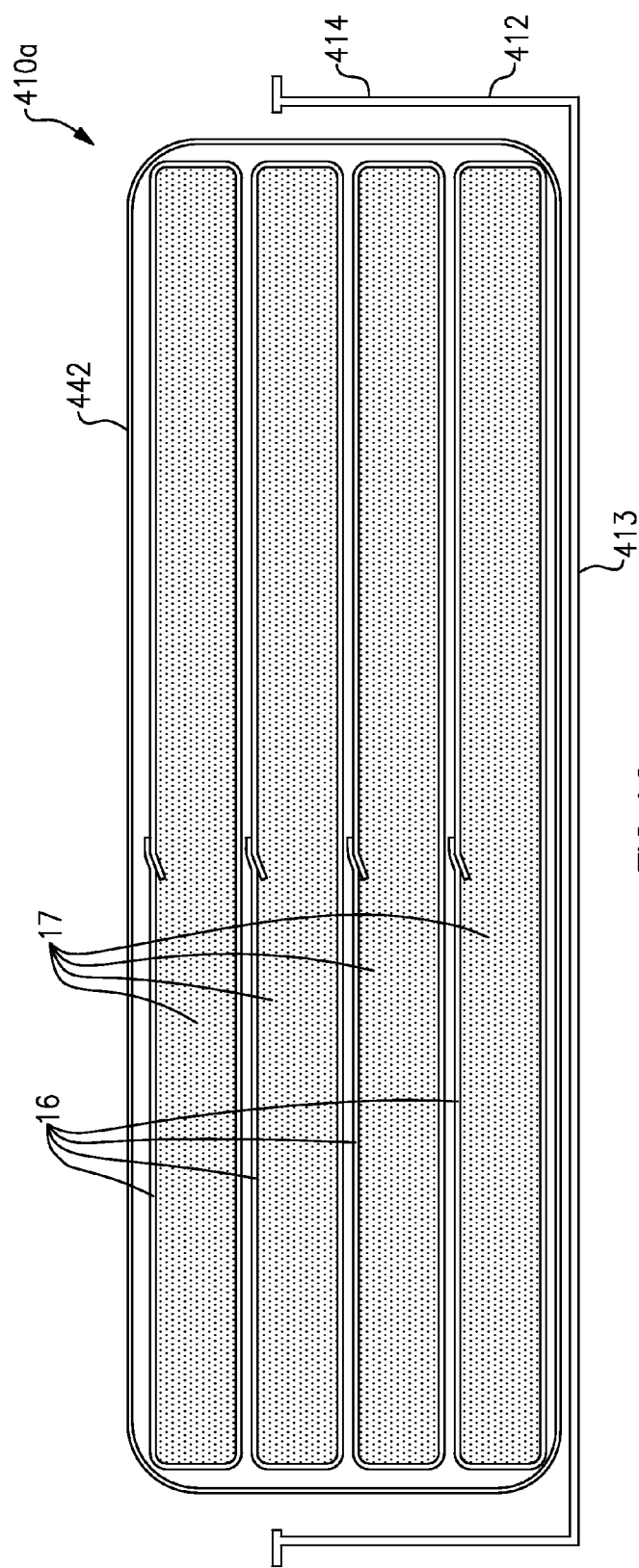
FIG. 16 shows the litter box of FIG. 13 with an alternate arrangement of the inner bags.

FIG. 16 shows an alternate the litter box 410a to the litter box 410 of FIG. 13 with an alternate arrangement of the inner bags 16. As shown, the bags 16 are closed to one another, with the upper portion of each bag 16 folded directly over the litter 17 inside it. The bottom of each bag 16 is in direct contact with the upper portion of the bag 16 below it. The litter box 410a is used in much the same way as the litter box 410 of FIG. 13, although only the upper portion of only one bag 16 at a time is draped over the side walls 14. The layers of litter 17 are exposed one at a time and removed after use by removing the bag 16 that contains that layer of litter 17.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers for steps in the method claims are for ease of reference by dependent claims, and do not indicate a required sequence, unless otherwise indicated.

What is claimed is:

1. A litter box comprising:
   a tray having a bottom wall and a plurality of side walls extending upward from the bottom wall, at least one of the plurality of side walls having an upper portion movable from a retracted position to an upright position, wherein an uppermost edge of the upper portion is an uppermost edge of the at least one side wall when the upper portion is in the upright position;
   a plurality of bags in the tray, wherein the plurality of bags are nested within one another; and
   a plurality of layers of litter, the plurality of layers separated from one another by the plurality of bags, wherein the upper portion of the at least one of the plurality of side walls is in the upright position and wherein an upper portion of a first bag of the plurality of bags is positioned over the uppermost edge of the upper portion of the at least one of the plurality of side walls.

2. The litter box of claim 1 wherein the at least one of the side walls is the plurality of side walls, wherein the plurality of side walls each include a flap portion, the flap portions forming the upper portions of the side walls, the flap portions connected together by connector strips attached to adjacent ones of the flap portions.

3. The litter box of claim 1 wherein the at least one of the side walls is the plurality of side walls, each of the plurality of side walls includes a flap portion, the flap portions forming the upper portions of the side walls, perforations between the flap portions and perforations between a center portion of the box and the flap portions, such that the center portion of the box can be removed and such that the flap portions can be separated and moved to the upright position.

4. The litter box of claim 1 wherein a first layer of the plurality of layers is on the first bag and wherein the first bag is on a second layer of the plurality of layers.

5. The litter box of claim 1 wherein each layer of litter is contained within a different one of the plurality of bags, such that a bottom of a first bag of the plurality of bags is on top of an upper portion of a second bag of the plurality of bags.

6. A litter box comprising:
   a tray having a bottom wall and a plurality of side walls extending upward from the bottom wall, at least one of the plurality of side walls having an upper portion movable from a retracted position to an upright position;
   a plurality of bags in the tray, wherein the plurality of bags are nested within one another; and
   a plurality of layers of litter, the plurality of layers separated from one another by the plurality of bags, wherein the upper portion of the at least one of the plurality of side walls is in the upright position and wherein an upper portion of a first bag of the plurality of bags is positioned over an uppermost edge of the upper portion of the at least one of the plurality of side walls.

7. The litter box of claim 6 wherein upper portions of the plurality of bags are draped over the upper portion of the at least one of the plurality of side walls.

8. A method for deploying and disposing of litter including the steps of:
   a) opening a container containing a first inner bag, a first layer of litter, a second inner bag and a second layer of litter;
   b) lifting an upper portion of the first inner bag over a side wall to expose the first layer of litter in the first inner bag in the container; and
   c) removing the first inner bag and the first layer of litter to expose the second layer of litter in the second inner bag in the container;
   wherein, prior to said step a), the first inner bag is inside the second inner bag.

9. The method of claim 8 wherein the container is an outer bag, the method further including the steps of placing the outer bag in a tray having a base wall and the side wall before said steps a), b) and c).

10. The method of claim 8 further including the step of moving an upper portion of the side wall from a position over the first inner bag to an upright position prior to said step b).

11. The method of claim 8 wherein the side wall is a side wall of the container.

12. A litter box comprising:
   a tray having a bottom wall and a plurality of side walls extending upward from the bottom wall, at least one of the plurality of side walls having an upper portion movable from a retracted position to an upright position, wherein the upper portion of the at least one of the plurality of side walls is in the upright position;
   a plurality of bags in the tray, wherein the plurality of bags are nested within one another; and a plurality of layers of litter, the plurality of layers separated from one another by the plurality of bags, wherein a first layer of the plurality of layers is on the first bag and wherein the first bag is on a second layer of the plurality of layers, and wherein an upper portion of a first bag of the plurality of bags is positioned over the upper portion of the at least one of the plurality of side walls.

13. The litter box of claim 12 wherein upper portions of the plurality of bags are draped over the upper portion of the at least one of the plurality of side walls.

14. The litter box of claim 12 wherein the plurality of side walls includes four side walls.

\* \* \* \* \*